(12) United States Patent
Nakamura et al.

(10) Patent No.: US 7,453,683 B2
(45) Date of Patent: Nov. 18, 2008

(54) CHIP-TYPE ALUMINUM ELECTROLYTIC CAPACITOR

(75) Inventors: Ryuji Nakamura, Yamaguchi (JP);
Hiroshi Kurimoto, Yamaguchi (JP);
Yasushi Kurasaki, Yamaguchi (JP)

(73) Assignee: Panasonic Corporation, Osaka (JP)

( * ) Notice: Subject to any disclaimer, the term of this patent is extended or adjusted under 35 U.S.C. 154(b) by 85 days.

(21) Appl. No.: 11/666,657

(22) PCT Filed: Nov. 14, 2005

(86) PCT No.: PCT/JP2005/020794

§ 371 (c)(1),
(2), (4) Date: May 1, 2007

(87) PCT Pub. No.: WO2006/051938

PCT Pub. Date: May 18, 2006

(65) Prior Publication Data

US 2008/0117567 A1    May 22, 2008

(30) Foreign Application Priority Data

Nov. 15, 2004   (JP)   .............................. 2004-330215

(51) Int. Cl.
*H01G 4/00* (2006.01)
(52) U.S. Cl. .................... 361/301.3; 361/516; 361/519; 361/523; 361/525; 361/529
(58) Field of Classification Search .............. 361/301.3, 361/301.2, 516, 517, 519, 523–525, 528–541; 29/25.01, 25.03
See application file for complete search history.

(56) References Cited

U.S. PATENT DOCUMENTS

| | | | | |
|---|---|---|---|---|
| 5,847,919 A | * | 12/1998 | Shimizu et al. | .............. 361/517 |
| 5,880,926 A | * | 3/1999 | Nishino et al. | .............. 361/517 |
| 6,052,273 A | * | 4/2000 | Inoue et al. | .................. 361/523 |

(Continued)

FOREIGN PATENT DOCUMENTS

JP    084727/1982    5/1982

(Continued)

*Primary Examiner*—Nguyen T Ha
(74) *Attorney, Agent, or Firm*—Wenderoth, Lind & Ponack, L.L.P.

(57) ABSTRACT

A chip-type aluminum electrolytic capacitor is provided that allows a lead wire exposed from an insulated terminal plate to have an increased temperature sooner than the other parts to provide highly-reliable soldering in a relatively-easy reflow atmosphere environment and that has a superior vibration resistance. The capacitor includes an insulated terminal plate (3) that includes, at the outer surface thereof, an insertion hole (2*a*) to which a pair of lead wires (2) introduced from a sealing member of a capacitor body are inserted and a first concave groove (2*a*) for storing lead wires (2) inserted to the hole while lead wires (2) being bent in an orthogonal direction. Insulated terminal plate (3) is attached to the capacitor so as to be abutted with the above sealing member. Metal electrode (4) is buried in an inner face of first concave groove (2*a*) provided in insulated terminal plate (3) and the periphery thereof. A part of metal electrode (4) is exposed at end face section (3*a*) of insulated terminal plate (3). The capacitor also has bidirectional second concave groove (6) that extends from the insertion hole of insulated terminal plate (3) to end sections (3*a*1, 3*a*2) of the insulated terminal plate.

4 Claims, 4 Drawing Sheets

U.S. PATENT DOCUMENTS

| | | | | |
|---|---|---|---|---|
| 6,064,563 A | * | 5/2000 | Yamada et al. | 361/521 |
| 6,118,646 A | * | 9/2000 | Yang et al. | 361/301.3 |
| 6,128,179 A | * | 10/2000 | Morokuma | 361/517 |
| 6,442,014 B1 | * | 8/2002 | Lin | 361/301.3 |

FOREIGN PATENT DOCUMENTS

| | | |
|---|---|---|
| JP | 051728/1986 | 4/1986 |
| JP | 168632/1987 | 10/1987 |
| JP | 04-037110 | 2/1992 |
| JP | 09-162077 | 6/1997 |
| JP | 09-289135 | 11/1997 |
| JP | 11-008151 | 1/1999 |
| JP | 11-233384 | 8/1999 |
| JP | 2000-315626 | 11/2000 |
| JP | 2001-052959 | 2/2001 |
| JP | 2002-111168 | 4/2002 |

* cited by examiner

F I G. 3
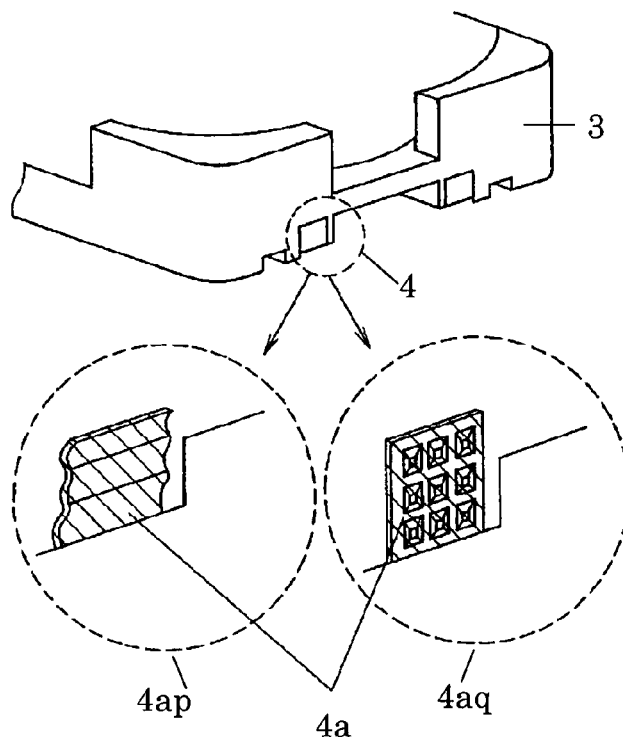
F I G. 4
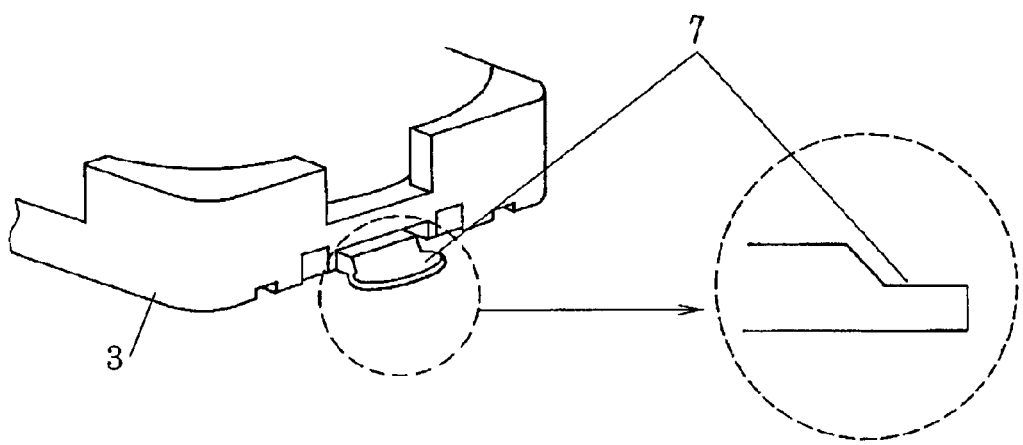

US 7,453,683 B2

CHIP-TYPE ALUMINUM ELECTROLYTIC CAPACITOR

TECHNICAL FIELD

The present invention relates to a chip-type aluminum electrolytic capacitor used for various electronic devices.

BACKGROUND ART

FIG. 6 is a perspective view illustrating a conventional chip-type aluminum electrolytic capacitor of this type. Metal case 11 has a cylindrical shape having a bottom and stores a capacitor element (not shown). An open end of metal case 11 is sealed by a sealing member (not shown). Drawn section 12 is provided in metal case 11 when the sealing member is sealed. Insulated terminal plate 13 is attached to metal case 11 so as to be abutted with the sealing member. Insulated terminal plate 13 includes a hole (not shown) to which lead wires 14 introduced from the capacitor element are inserted. In order to store lead wires 14 inserted to the hole while lead wires 14 being orthogonally bent, groove section 15 is provided at an outer surface (bottom face in FIG. 6) of insulated terminal plate 13. The structure as described above can allow the capacitor to be surface-mounted to a printed substrate (not shown).

When the above chip-type aluminum electrolytic capacitor is used for an electric circuit, the chip-type aluminum electrolytic capacitor is required to have a predetermined vibration resistance when the chip-type aluminum electrolytic capacitor is surface-mounted. Thus, a side face of insulated terminal plate 13 is extended to provide a side wall section to support metal case 11 having a cylindrical shape having a bottom.

It is noted that known related art regarding the technique of this application includes, for example, Japanese Patent Application No. H09-162077 and Japanese Patent Application No. H11-233384.

In the above conventional chip-type aluminum electrolytic capacitor, lead wire 14 exposed from insulated terminal plate 13 has small volume and surface area. Thus, when lead wire 14 is solder-mounted to insulated terminal plate 13 by reflow on the printed substrate (not shown), lead wire 14 must be heated to a reflow temperature of insulated terminal plate 13. When insulated terminal plate 13 is heated to the reflow temperature, disadvantages are caused where not only an increased temperature of the capacitor body but also significant heat stress to other components mounted to the printed substrate are caused.

With regards to a trend for a reflow temperature for solder mount, lead-free solder having a high melting point has been used from a viewpoint of the recent global environment conservation and a solder mount with a further higher reflow temperature has been required.

In FIG. 7, the conventional chip-type aluminum electrolytic capacitor having the structure shown in the perspective view of FIG. 6 is applied with vibration stress in the shown directions for a vibration test. As shown in FIG. 7, when strong vibration stress is applied to the chip-type aluminum electrolytic capacitor in direction Y orthogonal to direction X along which lead wires 14 are connected, the capacitor body pendulates because the capacitor is joined to the substrate at two positions by lead wires 14. It is noted that direction Z shows an up-and-down direction of the capacitor body. Thus, soldered parts of lead wire 14 and the substrate and a root of lead wire 14 are damaged to cause a risk where the soldered parts may peel and lead wire 14 may be damaged or broken.

SUMMARY OF THE INVENTION

The present invention provides a chip-type aluminum electrolytic capacitor that eliminates the disadvantages of the conventional design as described above. A temperature of a lead wire exposed from an insulated terminal plate provided in a chip-type aluminum electrolytic capacitor is increased sooner than those of the other parts. By doing this, a highly-reliable soldering property can be secured in a relatively-easy reflow atmosphere.

In order to provide a chip-type aluminum electrolytic capacitor having a superior vibration resistance, the chip-type aluminum electrolytic capacitor of the present invention includes a capacitor element. The chip-type aluminum electrolytic capacitor of the present invention also includes a metal case having a cylindrical shape having a bottom for storing the capacitor element together with driving electrolytic solution. The capacitor also includes a hole inserted with the above pair of lead wires and includes a sealing member for sealing an open end of the metal case. The capacitor also includes an insulated terminal plate. The insulated terminal plate has, at the outer surface thereof, a hole to which the pair of lead wires introduced from the sealing member are inserted and the first concave groove for storing the lead wires inserted to this hole while the lead wires being bent in a substantially orthogonal direction. The insulated terminal plate is attached to the capacitor so as to be abutted with the above sealing member.

The insulated terminal plate includes the first concave groove. The capacitor also includes a metal electrode that is buried in the inner face of the first concave groove and the periphery thereof. A part of the metal electrode is exposed at the side face of the insulated terminal plate. The capacitor also includes the bi-directional second concave groove that extends from the lead wire insertion hole provided in the insulated terminal plate to an end section of the insulated terminal plate.

In the chip-type aluminum electrolytic capacitor according to the present invention having the structure as described above, a metal electrode is buried in the inner face of the first concave groove provided in the insulated terminal plate and the periphery thereof and a part of the metal electrode is exposed at the side face of the insulated terminal plate. This can provide an increased surface area for a soldering process to a printed substrate. The metal electrode exposed from the side face of the insulated terminal plate allows solder to enter even the metal electrode at the bottom face of the insulated terminal plate. This can provide secure soldering, thus providing a further improved soldering strength.

The existence of the bi-directional second concave groove that extends from the insertion hole of the insulated terminal plate to the end face section of the insulated terminal plate provides an increased area to a terminal receiving reflow air during a reflow soldering process, thereby providing a path at the groove section provided at the outer surface of the insulated terminal plate to which reflow air can enter. This allows the lead terminal to have an increased temperature sooner than the other parts of the body of the chip-type aluminum electrolytic capacitor. Thus, the reflow atmosphere can have a reduced temperature to suppress, even when lead-free solder having a high melting point is used for example, heat stress from being transmitted to other parts and to provide a soldering operation having a higher efficiency.

Furthermore, the reduced temperature increase of the capacitor body can mitigate the heat stress caused by the reflow in the capacitor body. This is particularly advantageous for a chip-type aluminum electrolytic capacitor of a φ8 size or more (diameter of 8 mm or more) that has a high heat capacity to require a high atmosphere temperature during a reflow process.

BRIEF DESCRIPTION OF THE DRAWINGS

FIG. 3 is a partial perspective view illustrating a part of a metal electrode according to Embodiment 2 of the present invention.

FIG. 4 is a partial perspective view illustrating a part of a tip end section of a lead wire exposed from an insulated terminal plate according to Embodiment 3 of the present invention.

| 1 | Capacitor body |
| 2 | Lead wire |
| 2a | One side of lead wire insertion hole |
| 2b | The other side of lead wire insertion hole |
| 3 | Insulated terminal plate |
| 3a | End face section |
| 3a1 and 3a2 | End section |
| 3c | Center part |
| 4 | Metal electrode |
| 4a | Exposed metal electrode section |
| 5 | First concave groove |
| 6 | Second concave groove |

DETAILED DESCRIPTION OF PREFERRED EMBODIMENTS

Embodiment 1

Figure 1A:
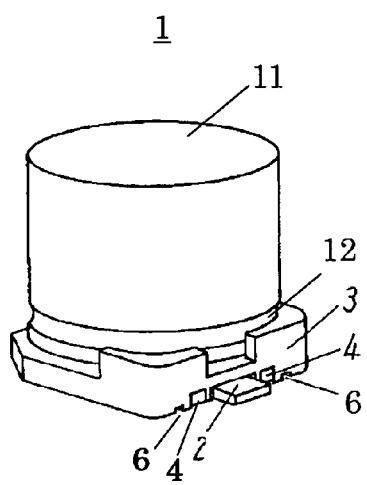
FIG. 1A is a perspective view illustrating the structure of a chip-type aluminum electrolytic capacitor according to Embodiment 1 of the present invention.

FIG. 1A is a perspective view illustrating the structure of a chip-type aluminum electrolytic capacitor according to Embodiment 1 of the present invention. FIG. 1A shows capacitor body 1, lead wires 2 drawn from capacitor body 1, insulated terminal plate 3, metal electrode 4, and second concave groove 6. It is noted that, although the interior of capacitor body 1 is not shown, capacitor body 1 includes therein a capacitor element that is provided by winding an anode foil and a cathode foil respectively connected with an anode lead wire and a cathode lead wire to be drawn to outside while providing a separator therebetween.

Figure 6:
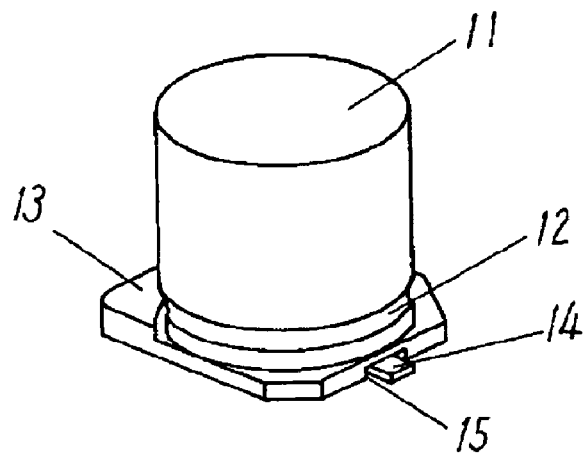
FIG. 6 is a perspective view illustrating the structure of a conventional chip-type aluminum electrolytic capacitor.
Figure 7:
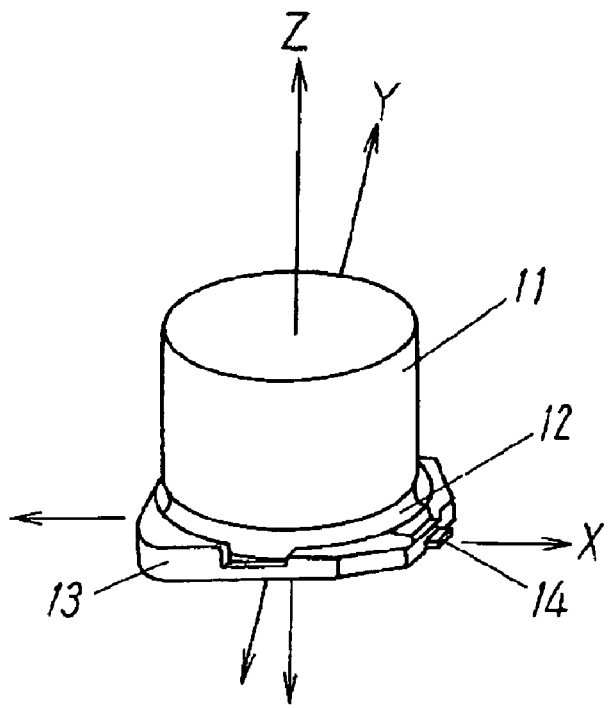
FIG. 7 is a perspective view illustrating vibration directions along which vibration is applied to a conventional chip-type aluminum electrolytic capacitor in a vibration test.

Substantially the same as in the conventional example shown in FIG. 6, capacitor body 1 of the present invention has metal case 11. An open end of metal case 11 is sealed by a sealing member (not shown). Drawn section 12 is provided in metal case 11 when the sealing member is sealed.

Figure 1B:
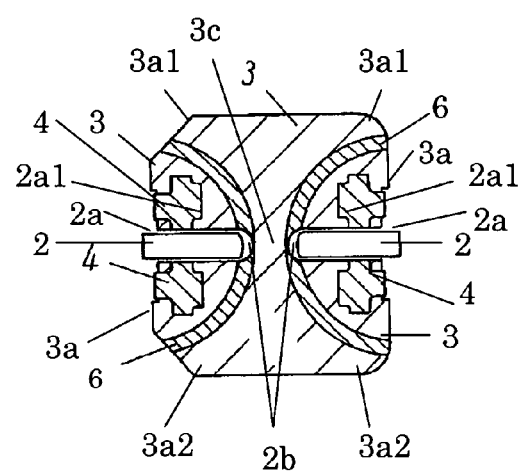
FIG. 1B is a bottom view illustrating an insulated terminal plate shown in FIG. 1A according to Embodiment 1 of the present invention.

FIG. 1B is a bottom view illustrating the chip-type aluminum electrolytic capacitor shown in FIG. 1A. In FIG. 1B, the same components as those of FIG. 1A are denoted with the same reference numerals.

When FIG. 1B is seen straight, lead wires 2 are provided at substantially the center of insulated terminal plate 3. One of lead wires 2 is an anode lead wire of the chip-type aluminum electrolytic capacitor and the other is a cathode lead wire. A lead wire insertion hole 2b in which to insert the lead wire 2 and a first concave groove 2a in which to store the lead wire 2 are provided in extension from the end face section 3a of the insulated terminal plate 3 toward the center 3c of the insulated terminal plate 3. At a position adjacent to the first concave groove 2a in which to store the lead wire is formed a first concave groove border portion 2a1. A first concave groove border portion 2a1 is also formed on both the anode lead wire side and the cathode lead wire side in about the same shape and size. A metal electrode 4 is formed on the entire part of the first concave groove border portion 2a1. The first concave groove border portion 2a1 is of the same size as the metal electrode 4 and is of about the same shape as the latter.

In Embodiment 1, metal electrode 4 is partially exposed at a side face of insulated terminal plate 3. Thus, heat absorption of a temperature during a reflow process can be improved by metal electrode 4. Metal electrodes 4 are provided at both sides of lead wires 2. Metal electrodes 4 are also buried in a range from the interior of first concave groove border portion 2a1 to the outer periphery. Heat absorption at exposed metal electrode 4 is performed, during a soldering process, while simultaneously performing heat absorption at lead wire 2 via solder. Thus, the entire volume in the heat absorption range is increased, thereby providing quick heat absorption. It is noted that the exposed part of metal electrode 4 may be provided by any of a method for previously providing metal electrode 4 in a metal mold to subsequently flow and shape insulating resin in the metal mold to bury the resin in insulated terminal plate 3 or a method for forming insulated terminal plate 3 to subsequently attach insulated terminal plate 3 to metal electrode 4.

Second concave grooves 6 are provided from lead wire insertion hole 2b provided in the vicinity of center part 3c of insulated terminal plate 3 to end sections 3a1 and 3a2 of insulated terminal plate 3, respectively. Specifically, second grooves 6 are provided bi-directionally. As in first concave groove 2a, second concave grooves 6 have substantially the same shape and size both at the anode lead wire and the cathode lead wire. Second concave groove 6 is formed so as to surround lead wire 2 and metal electrode 4. Thus, second concave grooves 6 are symmetrically formed to sandwich center part 3c of insulated terminal plate 3 and to determine the positions of lead wire 2 and metal electrodes 4.

By providing second concave groove 6, during a reflow process, reflow air flows from lead wire insertion hole 2a provided at an outer surface insulated terminal plate 3 to end sections 3a1 and 3a2 of insulated terminal plate 3. Thus, lead wire 2 can have an increased temperature sooner than those of the other parts of the chip-type aluminum electrolytic capacitor.

Figure 2:
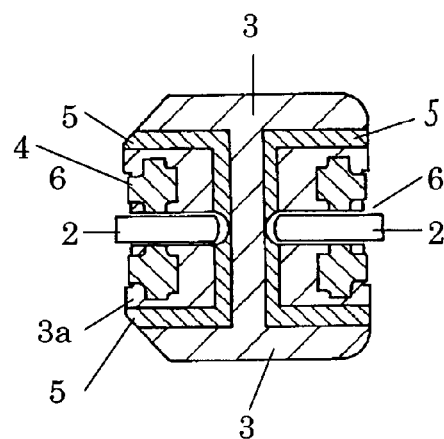
FIG. 2 is a bottom view illustrating the structure of another insulated terminal plate according to Embodiment 1 of the present invention.

It is noted that second concave groove 6 also may be shaped to have, in addition to a circular arc-like shape as shown in FIG. 1B, a straight shape as shown in FIG. 2 or a combination thereof.

It is noted that, reflow air also can be flowed to lead wire 2 by, instead of providing second concave groove 6 on the outer surface of insulated terminal plate 3, floating the entirety of insulated terminal plate 3 by providing a projection on the outer surface. In this floating structure, the entirety of insulated terminal plate 3 is floated. Thus, it can be expected that contact between the metal electrode at the outer surface of insulated terminal plate 3 and solder may be deteriorated. Thus, provision of second concave groove 5 used in Embodiment 1 is more effective than this floating structure.

Embodiment 2

FIG. 3 is a perspective view illustrating exposed metal electrode 4a that is a part of metal electrode 4 bent along the side face of insulated terminal plate 3 according to Embodiment 2 of the present invention. FIG. 3 shows exposed metal electrode section 4a of metal electrode 4 and enlarged part 4ap shows metal electrode section 4a having a corrugated plate-like shape and enlarged part 4aq shows metal electrode section 4a having a projection-like shape, respectively.

When exposed metal electrode 4a thus exposed is shaped to have a convexoconcave shape, the exposed part of metal electrode 4 can have an increased surface area. Thus, the entirety of metal electrode 4 can absorb heat of reflow air. Thus, the insulated terminal plate can have an improved heat absorption property.

It is noted that the convexoconcave shape provided at the surface of metal electrode 4 is not limited to the shape shown in FIG. 3 and also may have a lattice shape or a wavelike shape for example.

Embodiment 3

FIG. 4 is a perspective view illustrating the structure of lead wire 2 exposed from first concave groove 2a provided in insulated terminal plate 3 according to Embodiment 3 of the present invention. Lead terminal 7 is structured to have a wide width to have increased volume and surface area. The structure as described above increases the entire area receiving reflow air. Thus, heat absorption at lead terminal 7 can be performed in an effective and quick manner. Thus, lead terminal 7 can have an increased temperature sooner than those of the other parts of the chip-type aluminum electrolytic capacitor.

The volume or the surface area of lead terminal 7 also can be increased by increasing the length of lead terminal 7. However, the structure as described above requires a land of a printed substrate (not shown) to which lead terminal 7 is mounted to have an increased length in the lead wire direction. In contrast with this, the structure of the present invention using lead terminal 7 having an increased width allows the increased width part of lead terminal 7 to be within a region of metal electrode 4. This prevents a land provided at the printed substrate from having an increased area.

Embodiment 4

Figure 5:
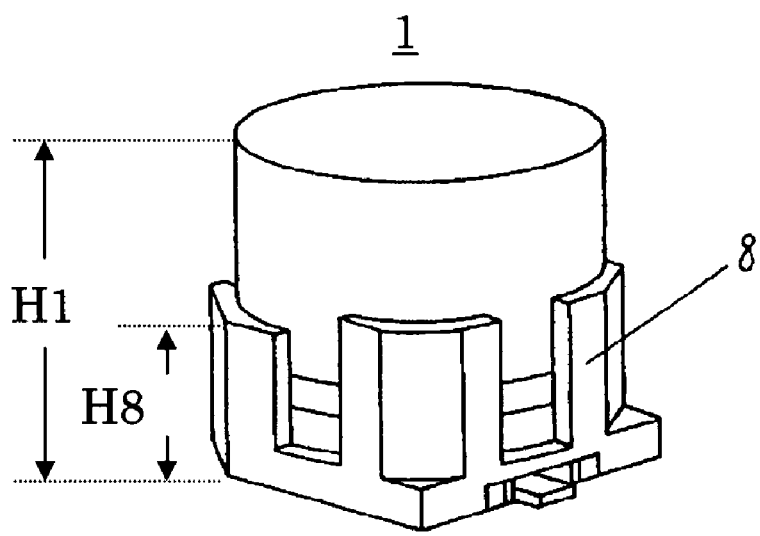
FIG. 5 is a perspective view illustrating the structure of a chip-type aluminum electrolytic capacitor according to Embodiment 4 of the present invention.

FIG. 5 is a perspective view illustrating wall sections 8 provided at four corners of the insulated terminal plate that are abutted with capacitor body 1 according to Embodiment 4 of the present invention. Wall sections 8 are abutted with capacitor body 1. Wall section 8 has height H8 that is substantially a half or more of height H1 of capacitor body. Thus, an improved vibration resistance can be obtained. It is noted that wall section 8 having height H8 that is a half or less of height H1 of capacitor body causes a lower vibration resistance. In particular, when the capacitor body has a reduced diameter $\phi$ of 10 mm or less, the vibration resistance is lowered. Thus, wall section 8 preferably has height H8 that is substantially a half or more of height H1 of the capacitor body.

By the structure of the chip-type aluminum electrolytic capacitor shown in Embodiment 4, metal electrode 4 provided at the outer surface of insulated terminal plate 3 can be used to securely fix insulated terminal plate 3 and a printed substrate (not shown). This can provide, even in a case of a chip-type aluminum electrolytic capacitor having a relatively large size that has a slightly weak vibration resistance, the chip-type aluminum electrolytic capacitor with a soldering property for coping with lead-free solder and a superior vibration resistance.

In Embodiments 1 and 3, twenty chip-type aluminum electrolytic capacitors for which a capacitor body had a diameter $\phi$ of 16 mm were prepared. Then, these capacitors surface-mounted to printed substrates were assumed as models. These models were compared with a conventional product with regards to temperature increases of a surface of a printed substrate (at which the capacitor body is not attached) during a reflow soldering process, capacitor body 1, and lead wire 2. The result is shown in Table 1.

TABLE 1

| Measured Parts | Substrate surface | Conventional | | Embodiment 1 | | Embodiment 3 | |
| --- | --- | --- | --- | --- | --- | --- | --- |
| | | Lead wire | Capacitor body | Lead wire | Capacitor body | Lead wire | Capacitor body |
| Peak temperature (° C.) | 245 | 201 | 202 | 221 | 203 | 224 | 203 |
| Retained time (second) at 200° C. ≦ | 70 | 3 | 7 | 43 | 8 | 51 | 9 |
| Retained time (second) at 220° C. ≦ | 40 | . . . | . . . | 5 | . . . | 15 | . . . |

As is clear from Table 1, the chip-type aluminum electrolytic capacitor according to this embodiment can allow, during a reflow process, lead wire 2 to have an increased temperature sooner than the other parts of the chip-type aluminum electrolytic capacitor. Thus, both of Embodiment 1 and Embodiment 3 show that lead wire 2 has a temperature about 20° C. higher than the temperature of capacitor body 1. This means that there is substantially no temperature difference between a printed substrate surface (at which the product is not attached) and the lead wire. This can provide, even when lead-free solder has an increased melting point, a stable soldering property to the lead wire without causing a significant increase in a reflow atmosphere temperature.

The chip-type aluminum electrolytic capacitor of the present invention was subjected to a temperature increase test. For the test, a peak temperature of a substrate surface to be surface-mounted was set to be 245° C. When a conventional product is subjected to this test, a lead wire and a capacitor body had temperatures of 201° C. and 202° C., showing substantially no temperature difference therebetween. In other words, when such a conventional product is heated to heat the lead wire to a predetermined temperature, other parts other than the lead wire for which temperature increase is not desired are caused to have increased temperatures, which is not preferable.

In contrast with this, when Embodiment 1 of the present invention was subjected to the temperature increase test based on the same conditions for the conventional product, the lead wire showed a temperature of 221° C. and the capacitor body showed a temperature of 203° C. Specifically, the former and the latter have a temperature difference of about 20° C. Thus, a part for which an increased temperature is desired (lead terminal) has an increased temperature and a part for which an increased temperature is not desired (e.g., capacitor body) has no an increased temperature, thus providing a favorable result.

Embodiment 3 of the present invention also showed substantially the same result as that of Embodiment 1.

It is noted that Embodiment 3 showed the lead wire having a temperature of 224° C. and the capacitor body having a temperature of 203° C. that is equal to the temperature of the capacitor body of Embodiment 1. This shows that Embodiment 3 also shows a temperature difference of about 20° C. between the former and the latter.

Table 1 also shows another factor. Specifically, the substrate surface during a reflow soldering process showed a peak temperature of 245° C. and retained a temperature of 200° C. or more for about 70 seconds and retained a temperature of 220° C. or more for about 40 seconds.

On the other hand, in the case of the conventional product, the lead wire of showed a peak temperature of 201° C. and the capacitor body showed a peak temperature of 202° C. In the case of the conventional product, the lead wire retained a temperature of 200° C. or more for about 3 seconds and the capacitor body retained a temperature of 200° C. or more for about 7 seconds.

In contrast with this, in the case of Embodiment 1, the lead wire showed a peak temperature of 221° C. and the capacitor body showed a peak temperature of 203° C. In the case of Embodiment 1, the lead wire retained a temperature of 200° C. or more for 43 seconds and the capacitor body retained a temperature of 200° C. or more for 8 seconds.

As can be seen from the above, the capacitor of Embodiment 1 can have a higher temperature of a lead wire than in the case of the conventional product and also allows the lead wire to retain a temperature of 200° C. or more longer than in the case of the conventional product. Thus, the capacitor of Embodiment 1 can provide a stable soldering property.

Since the lead wire in Embodiment 1 of the invention can retain a temperature of 220° C. or more, a stable soldering property can be obtained without causing a significant increase in a reflow atmosphere temperature even when lead-free solder has an increased melting point.

It is noted that the same finding as that of Embodiment 1 applies to Embodiment 3 and Embodiment 3 allowed a lead wire to retain a temperature of 220° C. or more for a time longer than in the case of Embodiment 1.

INDUSTRIAL APPLICABILITY

The aluminum electrolytic capacitor of the present invention is highly industrially applicable because it can cope with an increase of a melting temperature of lead-free solder and can be used for applications for a relatively large surface mount product requiring a high capacity and a long life for a power source for a communication base and an electronic device for an automobile such as an air bag for example.

The invention claimed is:

1. A chip-type aluminum electrolytic capacitor comprising:
   a capacitor element;
   a metal case having a cylindrical shape having a bottom for storing the capacitor element together with driving electrolytic solution;
   a sealing member including a hole to which a pair of lead wires are inserted and sealing an open end of the metal case;
   an insulated terminal plate that includes an insertion hole to which the pair of lead wires introduced from the sealing member are inserted and a first concave groove for storing the lead wires inserted to the hole while the lead wires being bent in an orthogonal direction and that is attached so as to be abutted with the sealing member;
   the first concave groove provided in the insulated terminal plate;
   a metal electrode buried in the first concave groove; and
   a second concave groove that exposes a part of the metal electrode at a side face of the insulated terminal plate and that extends from the insertion hole of the insulated terminal plate to an end section of the insulated terminal plate.

2. The chip-type aluminum electrolytic capacitor according to claim 1, wherein the metal electrode exposed from the insulated terminal plate is partially convexo-concave.

3. The chip-type aluminum electrolytic capacitor according to claim 1, wherein the lead wire exposed from the side end section of the insulated terminal plate is shaped so that a tip end section is wider than a part at the side end section and is thin.

4. The chip-type aluminum electrolytic capacitor according to claim 1, wherein four corners of the insulated terminal plate have wall sections that have a height being a half or more of a capacitor body and that are abutted with the capacitor body.

* * * * *